(12) United States Patent
Soucek

(10) Patent No.: US 9,120,519 B2
(45) Date of Patent: *Sep. 1, 2015

(54) AERO SEAT POST MOUNTING DEVICE

(71) Applicant: FELT RACING, LLC, Irvine, CA (US)

(72) Inventor: Jeff Soucek, Aliso Viejo, CA (US)

(73) Assignee: Felt Racing, LLC, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/190,599

(22) Filed: Feb. 26, 2014

(65) Prior Publication Data

US 2014/0252745 A1    Sep. 11, 2014

Related U.S. Application Data

(63) Continuation of application No. 13/955,227, filed on Jul. 31, 2013, now Pat. No. 8,702,116, which is a continuation of application No. 13/790,714, filed on Mar. 8, 2013, now Pat. No. 8,540,268.

(51) Int. Cl.
*B62J 1/00* (2006.01)
*B62J 1/08* (2006.01)
*B62K 19/02* (2006.01)
*B62K 19/36* (2006.01)

(52) U.S. Cl.
CPC . *B62J 1/08* (2013.01); *B62K 19/02* (2013.01); *B62K 19/36* (2013.01)

(58) Field of Classification Search
CPC .............. B62J 1/02; B62J 1/08; B62K 19/02; B62K 19/36
USPC ...................................... 280/281.1; 297/195.1
See application file for complete search history.

(56) References Cited

U.S. PATENT DOCUMENTS

| 2,770,479 A | 11/1956 | Hanns |
| 4,120,512 A | 10/1978 | Newlands |
| 4,417,744 A | 11/1983 | Spear |

(Continued)

FOREIGN PATENT DOCUMENTS

| DE | 202007015382 | 1/2008 |
| FR | 2564412 | 11/1985 |
| FR | 2928619 | 9/2009 |

OTHER PUBLICATIONS

European Search Report for European Application No. EP 13 17 0232; Aug. 30, 2013; 2 pages.

*Primary Examiner* — Tony Winner
(74) *Attorney, Agent, or Firm* — Stetina Brunda Garred & Brucker

(57) ABSTRACT

An aerodynamically shaped seat post fabricated from carbon fiber is mountable to a seat tube by placing left and right bushings within the hollow center of the seat post. These bushings are accessible and engageable to left and right bolts when the desired height of the seat post is reached. In particular, the left and right bolts are fed through left and right holes formed in the seat tube. The seat post has left and right elongate slots which provide access to the bushings, and more particularly, to the threaded holes of the bushings so that the left and right bolts may engage those threaded holes and clamp the left and right sidewalls of the seat post and the left and right sidewalls of the seat tube together, respectively. This seat post mount eliminates stress concentrations to the seat post. Moreover, the seat post is not clamped down with opposed forces placed on the left and right sidewalls of the seat post.

17 Claims, 4 Drawing Sheets

(56) References Cited

U.S. PATENT DOCUMENTS

| | | |
|---|---|---|
| 4,789,172 A | 12/1988 | Mueller |
| 4,850,733 A | 7/1989 | Shook |
| 5,033,790 A | 7/1991 | Schilplin et al. |
| 5,657,958 A | 8/1997 | McLaughlin et al. |
| 6,957,856 B2 | 10/2005 | Chiang et al. |
| 7,712,828 B2 | 5/2010 | Julliard et al. |
| 7,997,645 B2 | 8/2011 | Tseng |
| 8,066,295 B1 | 11/2011 | Cusack et al. |
| 2002/0033586 A1 | 3/2002 | Vroomen et al. |
| 2006/0078376 A1 | 4/2006 | Liao |
| 2007/0132203 A1 | 6/2007 | Yamakoshi |
| 2012/0200060 A1 | 8/2012 | D'Aluisio et al. |
| 2012/0326415 A1 | 12/2012 | Janssen |

AERO SEAT POST MOUNTING DEVICE

CROSS-REFERENCE TO RELATED APPLICATIONS

This application is a continuation patent application of U.S. patent application Ser. No. 13/955,227 filed on Jul. 31, 2013, which is a continuation patent application of U.S. patent application Ser. No. 13/790,714 filed on Mar. 8, 2013, the entire contents of which is expressly incorporated herein by reference.

STATEMENT RE: FEDERALLY SPONSORED RESEARCH/DEVELOPMENT

Not Applicable

BACKGROUND

The various embodiments disclosed herein are directed to a mounting device and method for securing an aerodynamically shaped seat post to a seat tube of a bicycle.

Traditional bicycles are typically fabricated from a metallic material such as aluminum for the purposes of balancing strength and weight. Current methods of manufacturing high-end bicycles involve the use of fabricating the various components of the bicycle including but not limited to the frame and seat post with carbon fiber material. The benefit of utilizing carbon fiber is that it is significantly lighter than aluminum. Unfortunately, carbon fiber has structural strength limitations compared to aluminum. By way of example and not limitation, carbon fiber material is more susceptible to breakage when exposed to a point concentration or a stress concentration.

In traditional aluminum bicycles, a seat post of the bicycle is connected to the seat tube in the following manner. The seat post is round and is inserted into the seat tube which has a corresponding circular tubular configuration. Moreover, the seat post is round or circular which makes these parts easy to manufacture while holding tight tolerances. Accordingly, traditional seat post have a tight fit with the seat tube. Frequently, in order to insert the seat post into the seat tube, one must initially insert the seat post into the seat tube while rotating the seat post back and forth until reaching the desired seat height. In order to lock the position of the seat height, the seat tube may have a split with a clamp that encircles the seat tube at the split. The clamp is tightened down so that the seat tube tightens down on the seat post. The clamp places forces on the periphery of the seat post. The friction between the seat post and the seat tube holds the seat post and the vertical height of the seat in position. The tight fit between the seat post and the seat tube and the round configuration prevents stress concentrations that might cause failure in the seat post or seat tube despite the high level of clamping forces created by the clamp.

As discussed, the trend in manufacturing bicycles is to manufacture bicycles from carbon fiber material due to its optimal light weight characteristic. Fortunately, since bicycles are being manufactured from carbon fiber material, the shapes of these bicycles can take on aerodynamic configurations. In other words, the seat tube and the seat post no longer need to be circular for manufacturing purposes. Rather, the seat post and seat tube may have other sleek aerodynamic shapes to reduce wind drag. Aerodynamic shapes are typically oval or oblong in cross-section. Unfortunately, due to the oval cross-section of the seat post, the clamp for mounting the seat post to the seat tube presses on the seat post unevenly thereby causing stress concentrations. As a result, bicycle manufacturers have had to increase the thickness of the carbon fiber material in order to withstand the compressive forces caused by the clamp to prevent failure of the seat post. The increased thickness causes increased weight. Increased weight causes the rider to be slower. In professional bicycle racing, a fraction of a second could mean the difference between winning and losing. Also, it is more difficult to obtain a tight fit between the seat post and the seat tube with carbon fiber. The loose fit between the seat post and the seat tube and the non-round configuration of the seat post create an environment where point concentrations are applied to the seat post and promote failure of the seat post.

Accordingly, there is a need in the art for an improved structure and method for clamping an aerodynamically shaped carbon fiber seat post to a seat tube.

BRIEF SUMMARY

The various aspects disclosed herein address the needs discussed above, discussed below and those that are known in the art.

A method and device for mounting an aerodynamically shaped seat post fabricated from carbon fiber to a seat tube is disclosed. Two bushings are inserted into a hollow center of the seat post having a non-circular shape (e.g., oval, oblong, aerodynamic). These bushings have a threaded hole which engages bolts for fixing a vertical height of the seat post/seat. In particular, the seat post has elongated slots along its height wherein the slots provide access to threaded holes of the bushings. An outer perimeter of the bushings matches the inner perimeter of the seat post so that as the bushings engage the inner surface of the seat post, no stress concentrations are created that might promote fracture or failure of the carbon fiber based seat post. The seat post is inserted into the seat tube and its height is adjusted. When the seat post is at the proper height, bolts which are inserted into holes formed in the upper portion of the seat tube or at the junction where the seat tube meets with the top tube engage the bushings. The left bolt clamps the left bushing, the left side wall of the seat post and the left side wall of the seat tube together. Likewise, the right bolt clamps the right bushing, the right side wall of the seat post and the right side wall of the seat tube together. Instead of placing opposed clamping forces on the outside of the seat post, the left and right sidewalls of the seat post are clamped independently by the left and right bushings and the left and right bolts. In this manner, stress concentrations are eliminated. Moreover, the seat post may be fabricated to be as thin as possible to reduce weight and improve time trials.

More particularly, a bicycle having an aerodynamically shaped seat post is disclosed. The bicycle may comprise an aerodynamically shaped seat post, a seat tube, left and right bushings and left and right fasteners. The aerodynamically shaped seat post may have a longitudinal cross sectional configuration defining a length greater than a width. The longitudinal cross sectional configuration also may define an outer perimeter. The length may be aligned to a forward moving direction of the bicycle. The seat post may have a hollow center along a height of the seat post wherein the hollow center defines an inner perimeter. Left and right openings may be formed in left and right sidewalls of the seat post.

The seat tube may have a hollow center defining an inner perimeter sized and configured to match the outer perimeter of the seat post so that the seat post may telescope into and out of the hollow center of the seat tube. The seat tube defines left and right side walls.

The left and right bushings may be disposed in the hollow center of the seat post. The first and second bushings may collectively have an outer perimeter matching the inner perimeter of the seat post.

The left fastener may be inserted into the left opening formed in the seat post for clamping the left bushing, the left sidewall of the seat post and the left sidewall of the seat tube together. The right fastener may be inserted into the right opening formed in the seat post for clamping the right bushing, the right sidewall of the seat post and the right sidewall of the seat tube together. By doing so, a vertical height of the seat post to the seat tube is fixed. Also, no clamping force is used to press on the outer periphery of the seat post.

The left and right fasteners may be left and right bolts. The left bolt may be inserted into a left opening formed into the left sidewall of the seat tube, a left opening formed into the left sidewall of the seat post and threadably engageable into a threaded hole formed in the left bushing. The right bolt may be inserted into a right opening formed into the right sidewall of the seat tube, a right opening formed into the right sidewall of the seat post and threadably engageable into a threaded hole formed in the right bushing.

The left and right openings which are formed in the seat post may have an elongate slot configuration. The left and right bushings may each have a tongue receivable into respective left and right elongate slots. After setting the seat height, left and right elongate grommets may be cut to size to fit a length of an exposed portion of the elongate slots. The left elongate grommet may be cut to size to match an upper end of the left elongate slot to an upper end portion of the seat tube. The right elongate grommet may be cut to size to match an upper end of the right elongate slot to an upper end portion of the seat tube. The exterior surfaces of the left and right grommets may be coextensive or blend in with the exterior surfaces of the left and right sidewalls of the seat post for promoting laminar flow over the grommets and reducing aerodynamic drag.

A compression spring may be disposed between the left and right bushings for urging the bushings outward, as shown in FIGS. 3 and 4.

The longitudinal cross sectional configuration of the seat post may have a rounded front leading surface.

The seat post may be fabricated from a carbon fiber material.

In a different aspect, a method of adjusting and securing a seat post height to a seat tube is disclosed. The method may comprise the steps of vertically traversing the seat post within the seat tube of a bicycle; spreading apart left and right bushings disposed within the seat post; expanding sidewalls of the seat post outward to engage sidewalls of the seat tube; clamping a left sidewall of the seat post between a left bushing and a left sidewall of the seat tube; and clamping a right sidewall of the seat post between a right bushing and a right sidewall of the seat tube.

The method may further comprise the step of maintaining a vertical position of the left and right bushings while the seat post is vertically traversed within the seat tube.

The method may further comprise the step of tightening left and right bolts engaged to the left and right bushings.

The method may further comprise the step of disposing left and right grommets within slots formed in the sidewalls of the seat post wherein exterior surfaces of the left and right grommets are coextensive with the exterior surfaces of the left and right sidewalls of the seat post.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
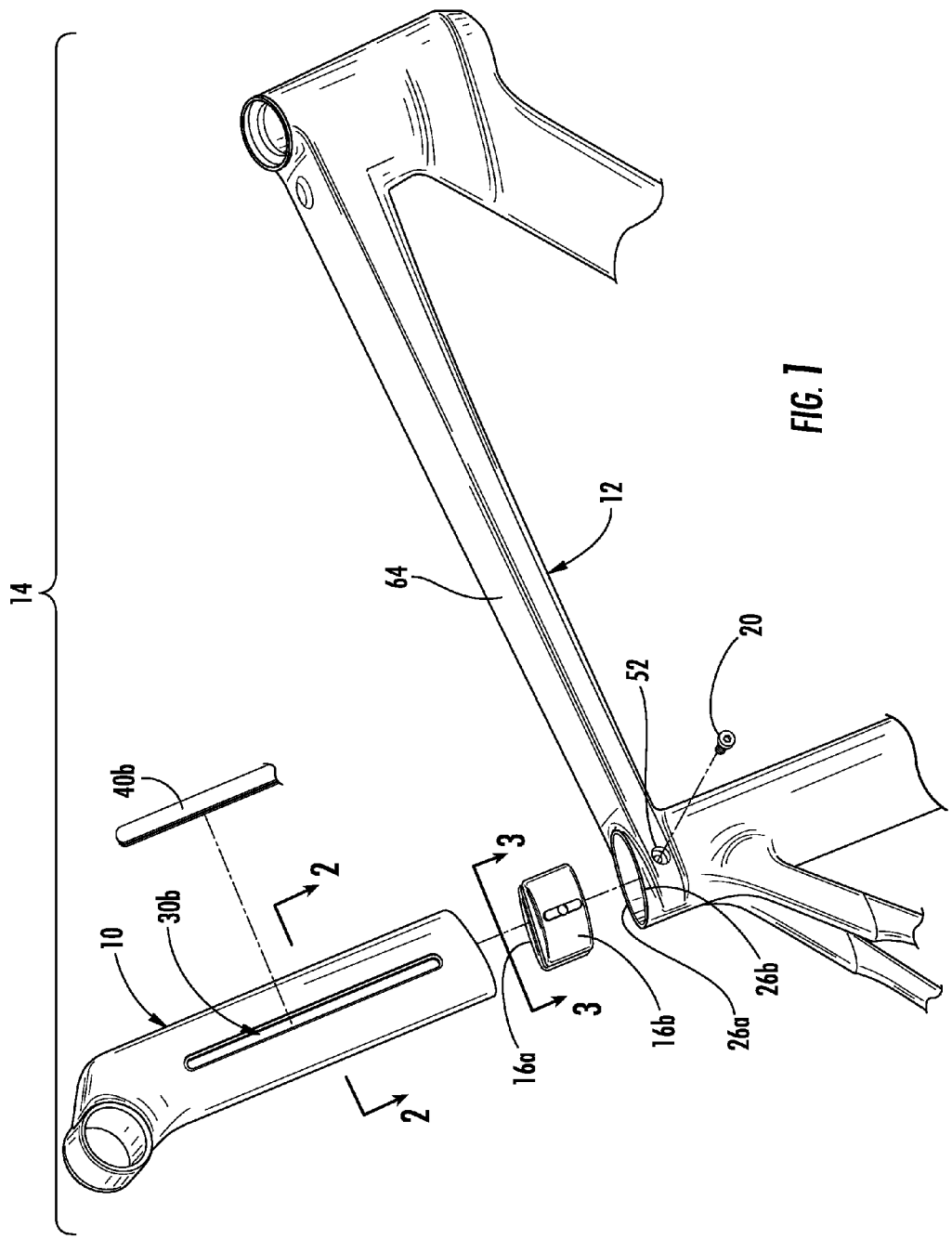
FIG. 1 is a perspective view of a seat post being mounted to a seat tube of a bicycle.

Referring now to the drawings, a lightweight aerodynamically shaped seat post 10 mounted to a seat tube 12 of a bicycle 14 is shown. The seat post 10 is secured to the seat tube 12 by way of left and right bushings 16a, b. These bushings 16a, b are disposed within a hollow center 18 (see FIG. 2) of the seat post 10 and can slide up and down a height of the seat post 10 during vertical adjustment of the seat post 10. The vertical position of the seat post 10 is adjustable based on the rider's physical geometry. Left and right bolts 20 may pass through each side of the seat tube 12/top tube 64 and be threaded into a threaded hole 22 (see FIG. 5) of the bushings 16a, b. As shown in FIG. 6, the bolts 20 may be tightened to clamp the left sidewall 24a of the seat post 10 to the left sidewall 26a of the bicycle frame (i.e., junction of the top tube 64 and seat tube 12) and clamp the right sidewall 24b of the seat post 10 to the right sidewall 26b of the bicycle frame. In this manner, the vertical height of the seat post 10 is fixed. The left and right bushings 16a, b are pulled outward. Beneficially, when fabricating a bicycle frame and a seat post from carbon fiber with this configuration, the seat post 10 may be fabricated so that the sidewalls 24a, b of the seat post may be thin (e.g., 0.040 inch) and lightweight. The seat post 10 does not need to be strengthened by increasing a thickness of the carbon fiber material to withstand an opposed clamping force on the left and right sidewalls of the seat post 10 as in the prior art. Additionally, the manufacturing of the seat post 10 is made simpler since the seat post 10 does not need to have a tight tolerance with the seat tube 12.

The seat tube 12, top tube 64 and the seat post 10 described herein may preferably be fabricated from carbon fiber. However, it is also contemplated that the various aspects described herein may be fabricated from other materials known in the art or developed in the future such as aluminum, chromoly steel, and titanium.

Figure 2:
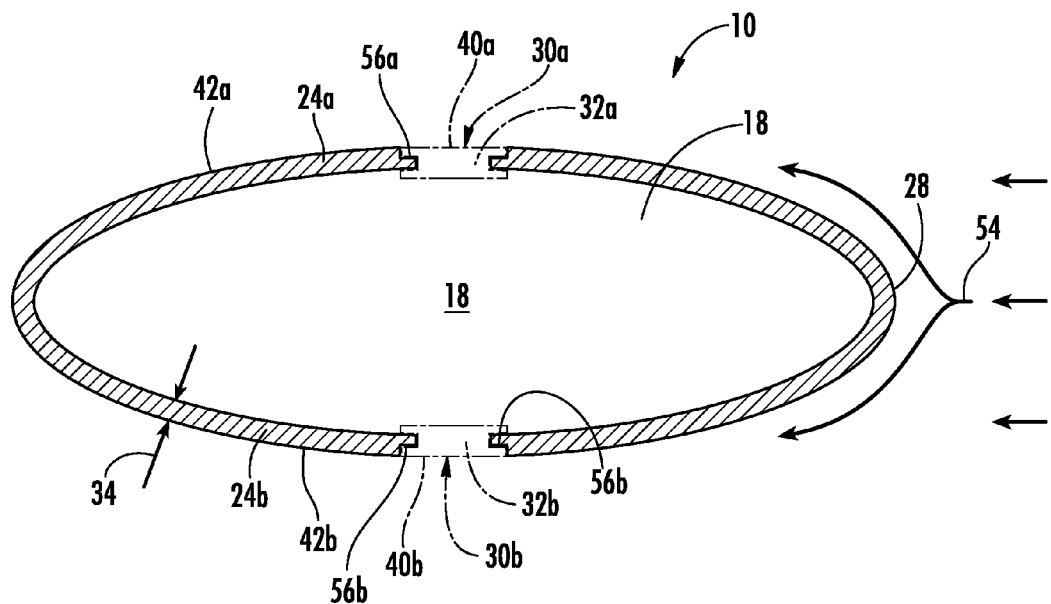
FIG. 2 is a cross-sectional view of the seat post shown in FIG. 1.
Figure 2A:
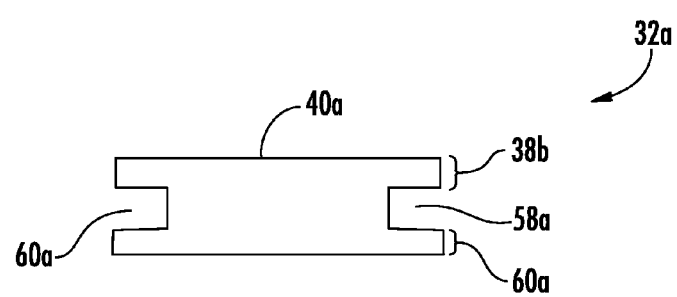
FIG. 2A illustrates grommets inserted into a slot formed on sidewalls of the seat post shown in FIGS. 1 and 2.
Figure 2A:
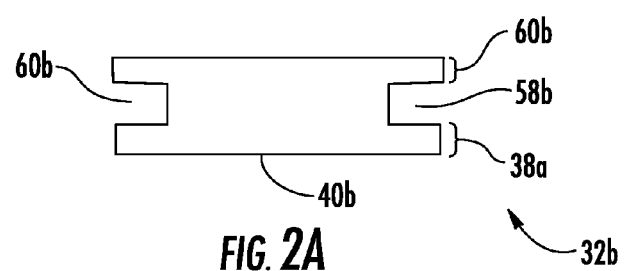

More particularly, as shown in FIG. 1, the seat post 10 may be inserted into the seat tube 12. The rider of the bicycle 14 may adjust the vertical height of the seat post 10 to fit his or her body geometry. The seat post 10 may have a cross-sectional external configuration ideal for aerodynamic purposes or reducing aerodynamic drag. As shown in FIG. 2, the leading surface 28 may be rounded to provide for aerodynamic efficiency. Air flow lines 54 show air moving past the leading edge of the seat post 10 and being split into two air flow paths, one on the left side and another on the right side. Moreover, the seat post 10 has left and right sidewalls 24a, b which are curved and connect at the rear end. The rear end portion of the left and right sidewalls 24a, b may have a pointed configuration, rounded configuration or any other configuration known in the art or developed in the future for the purposes of providing for aerodynamic efficiencies and reducing drag. The left and right sidewalls 24a, b each have an elongate slot 30a, b which extends along a height of the elongate slot 30a, b. The slots 30a, b provide lateral access to the threaded holes of the bushings 16a, b and allow the bushings 16a, b to slide up and down the seat post 10 when adjusting the height of the seat to fit the body geometry of the rider. The elongate slots 30a, b are sized and configured to respectively receive a grommet 32a, b. The grommet 32a, b helps the air flow 54 past the left and right sidewalls 24a, b in a laminar fashion to reduce drag.

The left and right sidewalls 24a, b may be as thin as possible to support the rider's weight and road conditions plus an acceptable safety factor. The purpose is to reduce the weight of the bicycle which has a direct impact on speed. During time trials or professional racing, each ounce or fraction of an ounce makes a significant difference on time or speed and may mean the difference between winning and losing. The thickness 34 of the sidewalls 24a, b of the seat post 10 may be sufficiently strong so that the seat post 10 can withstand normal use plus a safety factor to prevent failure or breakage.

The seat post 10 is also designed for vertical compliance. In other words, the seat post 10 behaves as a shock absorber to provide a more comfortable ride for the rider. In particular, the seat post 10 has an elongate slot 30a formed in the left side wall 24a. A corresponding elongate slot 30b is formed in the right side wall 24b. The slots 30a, b preferably do not extend to the very ends of the seat post 10. Rather, the slots 30a, b extends above the bottom end of the seat post 10 to below the top end of the seat post 10. The elongate slots 30a, b may be parallel with each other and centrally located on the left and right sidewalls 24a, b so that as the bushings 16a, b are spread apart by the bolts 20, the bushings 16a, b places an even outwardly directed pressure on the seat post 10 to frictionally engage the interior surface of the seat tube 12. These elongate slots 30a, b allow the sidewalls 24a, b to flex outwardly to engage the seat tube 12 and allow the seat post 10 to bend and flex to provide for the vertical compliance. Also, the seat post 10 may be symmetrical so that the seat post 10 may be rotated 180° to provide greater forward to back seat adjustment to the rider.

Referring now to FIG. 2, the elongate slots 30a, b may be formed with steps 56a, b. Outer portion 38a, b of the grommets 32a, b fit within steps 56a, b. Each of the grommets 32a, b may have an exterior surface 40a, b which is blended or coextensive with the exterior surface 42a, b of the left and right sidewalls 24a, b of the seat post 10. In other words, the exterior surfaces 42a, b of the left and right sidewalls 24a, b are coextensive with the exterior surfaces 40a, b of the grommet 32a, b. In this manner, air flows over the leading surface 28 of the seat post and is divided in two. The air flows over the exterior surfaces 42a, b of the left and right sidewalls 24a, b as well as the exterior surfaces 40a, b of the grommet 32a, b in a laminar fashion to reduce drag and increase aerodynamic efficiencies. The grommet 32a, b has grooves 58a, b, 60a, b that receive the steps 56a, b to hold the grommet 32a, b in place.

The grommets 32a, b may be fabricated from a flexible material including but not limited to rubber, plastic, etc. so that the user can push the inner portions 60a, b into the slots 30a, b to mount the grommets 32a, b within the slots 30a, b after vertically adjusting the seat height.

Figure 3:
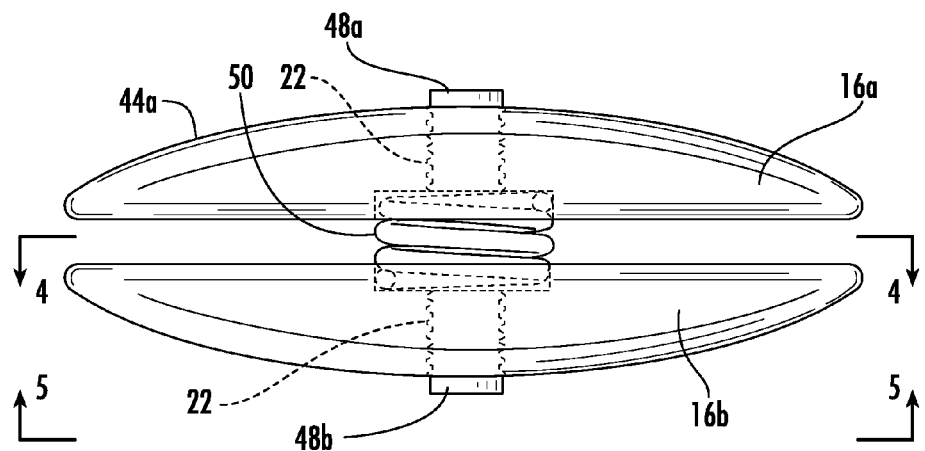
FIG. 3 is a top view of left and right bushings disposed within the seat post.
Figure 4:
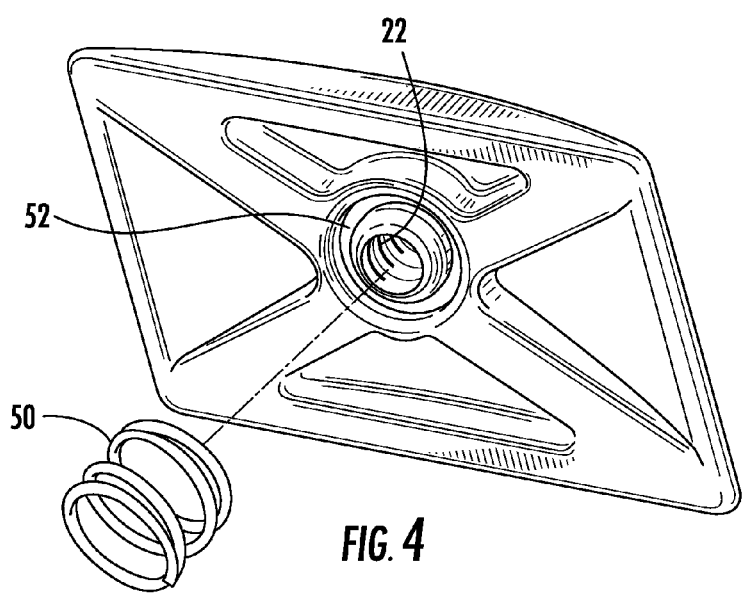
FIG. 4 is a perspective view of one of the bushings shown in FIG. 3 illustrating a medial side thereof.

The seat post 10 has a hollow center 18 (see FIG. 2). The hollow center 18 receives left and right bushings 16a, b. The left and right bushings 16a, b may be inserted into the seat post 10 from the bottom end of the seat post 10. The left bushing 16a has an outer surface 44a (see FIG. 3) which is matched to the configuration of an inner surface 46a of the left side wall 24a of the seat post 10. Additionally, the right bushing 16b has an outer surface 44b which is matched to the configuration of an inner surface 46b of the right side wall 24b of the seat post 10. In particular, the outer surfaces 44a, b of the left and right bushings 16a, b are convex. Conversely, the inner surfaces 46a, b of the left and right sidewalls 24a, b of the seat post 10 are concave. The curvatures of the convex outer surfaces 44a, b of the left and right bushings 16a, b are matched to the curvatures of the concave inner surfaces 46a, b so that the bushings 16a, b do not create any stress concentrations on the seat post 10 that might weaken the seat post 10 and cause the seat post 10 to break during use. By way of example and not limitation, the convex outer surfaces 44a, b of the bushings 16a, b may be formed with an oval configuration. The concave inner surfaces 46a, b may proportionally match the oval configuration of the convex outer surfaces 44a, b except that concave inner surfaces 46 may be slightly offset inward (e.g., 0.1 mm) compared to the convex outer surfaces 44a, b.

The left and right bushings 16a, b may additionally have tongues 48a, b formed on the lateral sides of the bushings 16a, b. These tongues 48a, b may be sized and configured to fit within the slots 30a, b when the left and right bushings 16a, b are inserted into the hollow center 18 of the seat post 10. To maintain the tongues 48a, b in the elongate slots 30a, b, a spring 50 may be disposed between the left and right bushings 16a, b to bias the left and right bushings 16a, b outward. When the left and right bushings 16a, b are inserted into the seat post 10 from the bottom, the left and right bushings 16a, b are squeezed together and pushed through until the tongues 48a, b are aligned to and received in the elongate slots 30a, b at which time the spring 50 pushes the left and right bushings 16a, b outward. The left and right bushings 16a, b are allowed to slide up and down the seat post 10 to the extent that the tongues 48a, b can slide within the slots 30a, b.

The junction where the seat tube 12 and top tube meet has countersunk holes 52a, b on opposed sides of the bicycle frame. The countersunk holes 52a, b receive the head of the bolt 20 so that the bolt head is not protruding out of the side of the bicycle frame. Rather, the head of the bolt 20 is flush with the side of the bicycle frame. The countersunk holes 52a, b may be formed by providing metallic inserts 70 which are embedded into the carbon fiber material during manufacturing. The metallic inserts 70 have the countersunk configuration and the carbon fiber is wrapped around the metallic inserts 70. The seat post 10 is inserted into the seat tube 12. As the seat post 10 is inserted into the seat tube 12, threaded holes 22 in the left and right bushings 16a, b are aligned to the holes 52 formed in the seat tube 12. When the threaded holes 22 of the left and right bushings 16a, b and countersunk holes 52a, b are aligned, bolts 20 are fed through the holes 52a, b formed in the seat post 10/top tube 64. The bolt threads engage the threaded holes 22 formed in the left and right bushings 16a, b. As the seat post 10 is vertically adjusted, the left and right bushings 16a, b are held in place by the bolts 20, and thus remain stationary. The left and right bushings 16a, b remain at the junction of the seat tube 12 and the top tube 64. When the desired vertical position of the seat post 10 is reached, the bolt 20 is tightened with an Allen wrench or other tool for which a head 66 of the bolt 20 is designed. By doing so, the outer surface of the bushing 16 is pressed against the inner surface of the sidewall 24 of the seat post 10. Also, the outer surface 44 of the seat post 10 is pressed against the inner surface 46 of the seat tube 12. As the bolts 20 are tightened, the left bushing and the left sidewall of the seat tube 10/top tube 64 clamp down on the left sidewall of the seat post 10. Likewise, the right bushing 16b and the right sidewall of the seat tube 10/top tube 64 clamp down on the right sidewall of the seat post 10. The friction between the outer surface 44 of the seat post 10 and the inner surface 46 of the seat tube 12 locks the vertical position of the seat post 10 to the seat tube 12.

Each of the left and right bushings 16a, b may have a medial side and a lateral side. On the medial side, a circular groove 52 is sized and configured to receive distal ends of the spring 50. The circular grooves 52 are sized and configured to receive and hold the spring 50 in place during assembly and vertical adjustment of the seat post 10.

Figure 5:
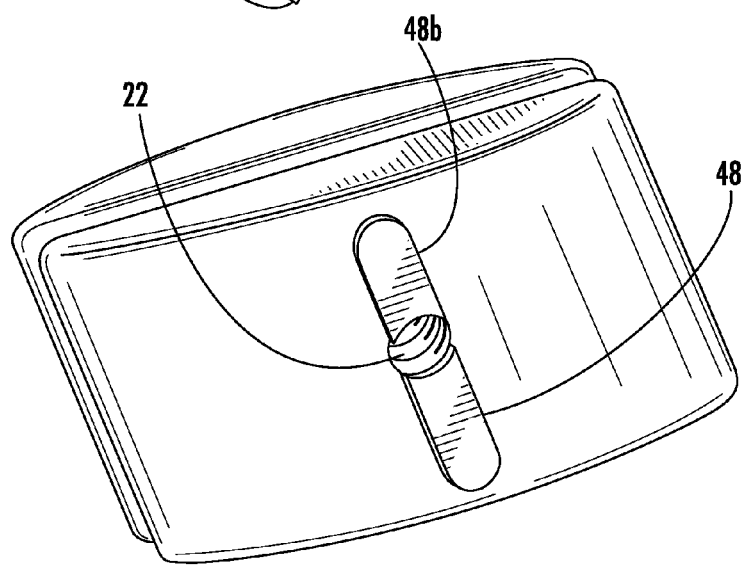
FIG. 5 is a perspective view of the bushings as shown in FIG. 1 illustrating a lateral side thereof.
Figure 6:
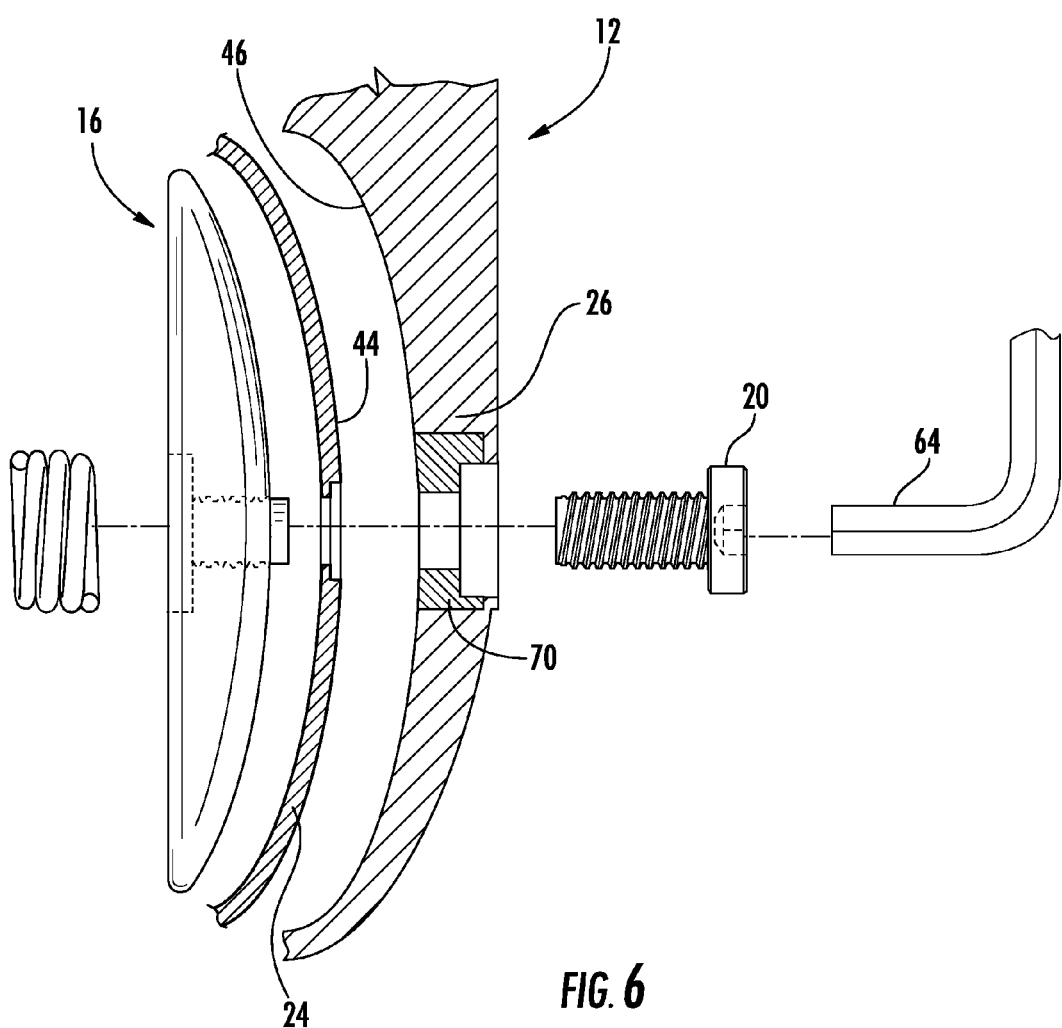
FIG. 6 is an exploded top view of a spring, the bushing, cross-section of the seat post and cross-section of the seat tube and cross-section of the top tube.

The threaded holes 22 in the left and right bushings 16a, b may be positioned centrally on the bushing 16, as shown in FIG. 5. One tongue 48 may be disposed above the threaded holes 22 and another tongue 48 disposed below the threaded hole 22.

The above description is given by way of example, and not limitation. Given the above disclosure, one skilled in the art could devise variations that are within the scope and spirit of the invention disclosed herein, including various ways of configuring the seat post and the seat tube. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A bicycle having a seat post, the bicycle comprising:
the seat post having a hollow center along a height of the seat post wherein the hollow center defines an inner perimeter, a first opening formed in a first sidewall of the seat post;
a seat tube having a hollow center defining an inner perimeter sized and configured to match the outer perimeter of the seat post so that the seat post may telescope into and out of the hollow center of the seat tube, the seat tube defining a first side wall;
a first bushing disposable in the hollow center of the seat post, the first bushing having an outer perimeter matching the inner perimeter of the seat post;
a first fastener inserted into the first opening formed in the seat post for clamping the first bushing, the first sidewall of the seat post and the first sidewall of the seat tube together to fix a vertical height of the seat post to the seat tube.

2. The bicycle of claim 1 wherein the seat post further has a second opening formed in a second sidewall of the seat post and the seat tube defines a second sidewall, the bicycle further comprising:
a second bushing disposable in the hollow center of the seat post, the outer perimeter collectively defined by the first and second bushings matching the inner perimeter of the seat post;
a second fastener inserted into the second opening formed in the seat post for clamping the second sidewall of the seat post and the second sidewall of the seat tube together to fix the vertical height of the seat post to the seat tube.

3. The bicycle of claim 2 wherein the first and second openings are left and right openings, the first and second sidewalls are left and right sidewalls, the first and second bushings are left and right bushings and first and second fasteners are left and right fasteners.

4. The bicycle of claim 3 wherein:
the left and right fasteners comprise left and right bolts, the left bolt being inserted into a left opening formed into the left sidewall of the seat tube, a left opening formed into the left sidewall of the seat post and threadably engageable into a threaded hole formed in the left bushing;
the right bolt being inserted into a right opening formed into the right sidewall of the seat tube, a right opening formed into the right sidewall of the seat post and threadably engageable into a threaded hole formed in the right bushing.

5. The bicycle of claim 3 wherein the left and right openings formed in the seat post has an elongate slot configuration.

6. The bicycle of claim 5 wherein the left and right bushings each has a tongue receivable into respective left and right elongate slots.

7. The bicycle of claim 5 further comprising left and right elongate grommets, the left elongate grommet cut to size to match an upper end of the left elongate slot to an upper end portion of the seat tube, the right elongate grommet cut to size to match an upper end of the right elongate slot to an upper end portion of the seat tube.

8. The bicycle of claim 3 further comprising a compression spring disposed between the left and right bushings.

9. The bicycle of claim 3 wherein the seat post is fabricated from a carbon fiber material.

10. The bicycle of claim 3 wherein the longitudinal cross sectional configuration of the seat post has a rounded front leading surface.

11. The bicycle of claim 10 wherein the exterior surfaces of the left and right grommets are coextensive with the exterior surfaces of the left and right sidewalls of the seat post for promoting laminar flow over the grommets and reducing aerodynamic drag.

12. A method of adjusting and securing a seat post height to a seat tube, the method comprising:
vertically traversing the seat post within the seat tube of a bicycle;
clamping a first sidewall of the seat post between a first bushing and a first sidewall of the seat tube;
clamping a second sidewall of the seat post between a second bushing and a second sidewall of the seat tube;
the first sidewall of the seat post, first bushing and first sidewall of the seat tube respectively being left sidewall of the seat post, left bushing and left sidewall of the seat tube;
the second sidewall of the seat post, second bushing and second sidewall of the seat tube respectively being right sidewall of the seat post, right bushing and right sidewall of the seat tube; and
spreading apart left and right bushings disposed within the seat post.

13. The method of claim 10 wherein the first sidewall of the seat post, first bushing and first sidewall of the seat tube respectively are left sidewall of the seat post, left bushing and left sidewall of the seat tube, and the second sidewall of the seat post, second bushing and second sidewall of the seat tube respectively are right sidewall of the seat post, right bushing and right sidewall of the seat tube, the method further comprising the step of:
flexing sidewalls of the seat post outward to engage sidewalls of the seat tube.

14. The method of claim 13 further comprising the step of maintaining a vertical position of the left and right bushings while the seat post is vertically traversed within the seat tube.

15. The method of claim 13 further comprising the step of tightening left and right bolts engaged to the left and right bushings.

16. The method of claim 13 further comprising the step of disposing left and right grommets within slots formed in the sidewalls of the seat post wherein exterior surfaces of the left and right grommets are coextensive with the exterior surfaces of the left and right sidewalls of the seat post.

17. A method of adjusting and securing a seat post height to a seat tube, the method comprising:
   vertically traversing the seat post within the seat tube of a bicycle;
   clamping a first sidewall of the seat post between a first bushing and a first sidewall of the seat tube;
   clamping a second sidewall of the seat post between a second bushing and a second sidewall of the seat tube;
   the first sidewall of the seat post, first bushing and first sidewall of the seat tube respectively being left sidewall of the seat post, left bushing and left sidewall of the seat tube;
   the second sidewall of the seat post, second bushing and second sidewall of the seat tube respectively being right sidewall of the seat post, right bushing and right sidewall of the seat tube; and
   flexing sidewalls of the seat post outward to engage sidewalls of the seat tube.

\* \* \* \* \*